SEMICONDUCTIVE TRANSLATING DEVICE

Filed Feb. 18, 1955

INVENTOR
D. H. LOONEY
BY D.H. Wilson, Jr.
ATTORNEY

United States Patent Office 2,791,758

Patented May 7, 1957

2,791,758

SEMICONDUCTIVE TRANSLATING DEVICE

Duncan H. Looney, Summit, N. J., assignor to Bell Telephone Laboratories, Incorporated, New York, N. Y., a corporation of New York Application February 18, 1955, Serial No. 489,141

6 Claims. (Cl. 340—173)

This invention relates to semiconductive signal translators and more particularly to switching devices which can be used to store information. The disclosures herein are related to those of J. A. Morton application Serial No. 489,241, entitled "Electrical Switching and Storage," filed herewith.

One object of this invention is to improve semiconductive devices which are employed for signal translation.

Other objects are to simplify apparatus for switching and storing information, to store information which can be read out without destruction, to alter selectively the conductivity of a circuit element by the application of a momentary electric impulse, and to maintain a circuit element in one of two conductive conditions without continuously expending energy.

In accordance with these objects, one feature of this invention comprises altering the conductivity of a path through a semiconductive body by polarizing a ferroelectric maintained in proximity to the body to alter the surface charge on a portion of that body.

Another feature resides in employing only a thin semiconductive body as a conductive path whereby the application of surface charge is effective in altering the conductivity of a substantial portion of the thickness of the path.

A further feature comprises utilizing a semi-conductive body having a thin surface portion of the conductivity type opposite that of the major body portion as the conductive path subject to surface charge modification by reverse biasing the n-p junction between the portions to isolate the main body portion from the conduction path in the surface portion.

The above and additional objects and features of this invention will be more fully appreciated from the following detailed description when read in conjunction with the accompanying drawing, in which.

Figure 1:
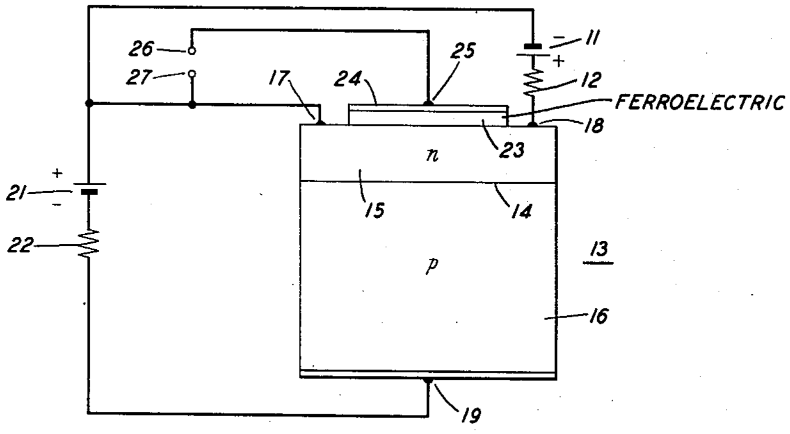
Fig. 1 is a schematic representation of the elevation of a device constructed in accordance with this invention in combination with a utilization circuit.

Those structures depicted in the drawing are arranged for illustrative purposes and are therefore distorted in their proportions. It may be noted that for the purposes of this invention the size of the major semiconductive body portion is chosen on a basis of convenience in manufacture and is not significant in the operation of the device other than as a thermal sink. The dimensions of the device normal to the plane of the paper are not critical although the greater they are the larger the effective cross-sectional area of the conductive path and the lower the impedance of that path.

The general operating characteristics which are realized from a circuit control element of the type to which this invention is directed are those of a switch having two stable states of operation, one offering a relatively high impedance and the other a relatively low impedance. The conductance in each state is independent of the polarity across the conductive path of the device and, at least at low frequencies, is essentially a linear resistance. These states of operation have memory, that is, they can be conditioned by the application of a signal to a control element, a ferroelectric, which rapidly establishes that state and then maintains it even after the signal has been removed or reduced. Current, either unidirectional or alternating and at constant or varied levels, can be passed through the conductive path within the device without altering the conductive state since this path is isolated from the control element. This mode of control utilizes the well known electrostatic hysteresis characteristics of ferroelectric materials whereby the application of an electrostatic field across a ferroelectric body establishes a charged state within the body at least a portion of which remains after the removal of the field or until the field is reversed. The general characteristics of ferroelectric materials applicable to the present invention are discussed in Introduction to Solid State Physics, by C. Kittel, Chapter 7, pages 113 through 133, John Wiley & Sons, Inc. (1953).

Referring now to Fig. 1 of the drawing, a utilization circuit including a potential source 11 and a load resistance 12 is connected across a control element 13. This control element comprises a semiconductive body, preferably of single crystal material, containing an n-p junction 14 separating a surface layer 15 of one conductivity type from a bulk portion 16 of opposite conductivity type. The utilization circuit is connected to this device by low resistance, nonrectifying contacts 17 and 18 engaging space portions of the surface region 15 of the body adjacent the n-p junction 14 whereby the surface region 15 constitutes an impedance in series with the utilization circuit. A third contact 19 is applied to the body on region 16 and is preferably of a type which makes a low resistance, nonrectifying connection thereto.

Control of the current passing through the utilization circuit is afforded by element 13 by altering the conduction characteristics of region 15 of the semiconductive body between contacts 17 and 18. This conduction path is restricted to surface region 15 by the n-p junction 14 between that region and the main body portion and the reverse bias applied across that junction by a potential source 21 connected through a limiting resistor 22 between terminals 17 and 18 and across the junction. The conduction across this isolated surface region is modified by the application of a surface charge thereto which it is believed effectively converts a portion of its surface region to a conductivity type opposite that of region 15, thereby reducing the cross-sectional area of the effective conductive path between terminals 17 and 18.

The mechanism of converting a surface portion or producing an inversion layer on surface region 15 is believed to be as follows: An extrinsic electronic semiconductor normally contains a predominance of one type of charge carrier which is available in a mobile state for conduction. N-type material contains a predominance of mobile electrons, negative charge carriers, while mobile holes, positive charge carriers, predominate p-type material. An electrostatic charge adjacent the surface of an electronic semiconductor causes a counteracting space charge within the semiconductor beneath that surface. Thus, the application of a negative charge adjacent an n-type surface attracts positive charge carriers in the semiconductor beneath that surface. These positive charge carriers, depending upon their concentration, either raise the effective resistance of the surface region by counteracting the electrons normally present, or when attracted in predominating concentrations overcome the electrons and function as the mobile charge carriers thereby converting the material to p-type. Conversely, p-type material can be increased in resistivity or converted to n-type by the application of an electron attracting positive charge adjacent its surface. This temporary conversion of a surface layer can be maintained so long as the charge is maintanied adjacent the surface.

Similarly, the application of a charge adjacent a surface of an electronic semiconductor of a polarity which attracts charge carriers of the type normally predominating therein will increase the predominance and thereby increase the conductivity of that surface region. This increase can also be maintained by maintaining the charge in the vicinity.

In accordance with this invention, the charge is established in the vicinity of the semiconductive surface by polarizing a ferroelectric body 23 mounted as close to that surface as possible. This polarization can be effected by applying an electrode 24 to the surface of the ferroelectric body spaced from the semiconductive surface, establishing a connection 25 to that electrode and applying a voltage between connection 25 and a connection to the surface region 15, whereby the semiconductive material of surface region 15 and the metallic electrode 24 function as the plates of a condenser and the ferroelectric body 23 positioned therebetween constitutes the condenser dielectric.

Figure 2:
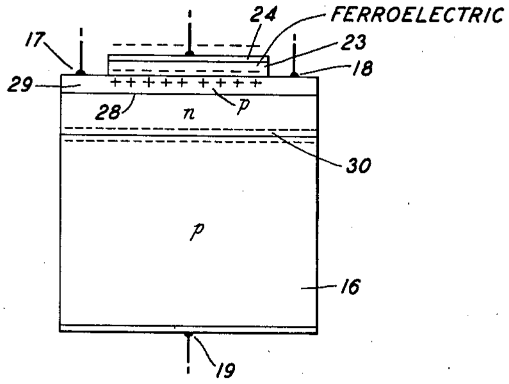
Fig. 2 shows the device of Fig. 1 with a representation of the charge distribution therein in one state of operation.

The electrostatic field thereby developed across the ferroelectric, if of sufficient magnitude to polarize the ferroelectric, will establish a polarization therein which will remain when the field has been removed or decreased. This polaziation in a ferroelectric has been termed the remnant polarization. In the case of the structure shown in Fig. 1 having an n-type semiconductive surface region 15, the application of a potential to terminal 26 which is negative relative to terminal 27 charges the electrode 24 negatively as shown in Fig. 2. This establishes a negative charge in the portion of the ferroelectric body adjacent the surface of n-type region 15, some of which remains due to the remnant polarization of the ferroelectric even after the removal of the signal from terminal 26. This negative charge in turn attracts a high concentration of positive charge carriers to the vicinity of the surface of region 15 adjacent ferroelectric body 23. The ferroelectric can readily be charged to a level which attracts a sufficient concentration of positive charge carriers to overcome the normal predominance of electrons in the n-type material and thereby temporarily convert that material to p-type, producing a second n-p junction 28 bounding the n-type material of region 15 extending between terminals 17 and 18. This n-p junction 28 bars the flow of current from surface region 15 into the surface inversion layer so that the available cross section available for conduction is reduced in area.

In practice it has been found that the application of a surface charge to a semiconductor such as germanium or silicon can produce an inversion region 29 or surface channel to a depth of about $10^{-5}$ centimeters. Thus, if the thickness of the surface region 15 is restricted and the conductivity of that region is distributed so that the elimination of the contribution of conductivity of a portion thereof extending to a depth of $10^{-5}$ centimeters has an appreciable effect upon the resistivity of the region, charging of a ferroelectric in the manner described above will change the effective impedance of the circuit between terminals 17 and 18 and thus the current passing through load 12. Thin surface regions can be produced on single crystal semiconductive bodies without altering their single crystal characteristics by diffusion techniques. For example, n-type surface regions of about $2\times10^{-5}$ centimeters thickness can be produced on p-type silicon by the diffusion of boron therein at controlled temperatures and for controlled intervals in accordance with the teachings of the application of C. S. Fuller, Serial No. 414,272, filed March 5, 1954, and entitled "Fabrication of Semiconductive Bodies." N-type surfaces of about $10^{-5}$ centimeters depth can be formed by preparing surfaces on p-type silicon as taught by Fuller and subjecting those surfaces to boron oxide a temperatures of about 900° C. for about 28 hours or 1050° C. for about 17 minutes. P-type surfaces of these thicknesses can be prepared under the same condiitons using phosphorous oxides. Similar processes are available for preparing germanium wtih thin surfaces of opposite conductivity type.

Surface layers of a conductivity type opposite that of the major portion of the body produced by diffusion have an impurity distribution which declines essentially exponentially with depth into the body. Hence, a surface region 15 of this nature is of highest conductivity in the portion immediately adjacent that surface upon which the diffusion process was practiced. Accordingly, elimination of this surface portion by the application of a charge thereto not only reduces the cross-sectional area of the conductive path across region 15, but also removes the portion of that region having the highest conductivity. This enables a substantial change to be realized in the conductivity of region 15 by placing a charge adjacent its surface.

A device arranged as shown in the drawings offers another means of control of the impedance of surface region 15. Again this control mechanism is the adjustment of the effective width of the cross section of the conducting path between 17 and 18. This additional control is effected at the side of surface region 15 adjacent n-p junction 14 by the application of a reverse bias to that junction. The bias depends upon the magnitude of potential source 21 and the magnitude of limiting resistor 22. A space charge region 30, a region from which the majority charge carriers normally available for conduction are withdrawn by the reverse bias, surrounds the junction and constitutes a low conductivity region due to the dearth of charge carriers therein. The depth to which this space charge region penetrates from junction 14 depends upon the bias across the junction. Hence, the impedance of the path through region 15 can be increased independently of the charge on the surface by increasing the reverse bias across junction 14 or, conversely, the impedance can be decreased by decreasing that bias.

In view of the control of the effective width of region 15 from its opposite faces, the position of the low resistance, substantially nonrectifying contacts 17 and 18 should be established over portions of the surface of region 15 which are not altered by the control mechanisms. Thus, these contacts can be placed on extensions of the surface region 15 or 35 which are beyond the portions subject to space charge penetration or to fields sufficient to create an inversion layer. In order to reduce the resistance of these connections, portions of the surface region can be made with a high conductivity by preferential diffusion, for example, as shown by the $p^+$ portions of region 35 in Fig. 3.

The device shown in Figs. 1 and 2 as a control element for the utilization circuit comprises a p-type body of single crystal material having an n-type surface region. The impedance between terminals 17 and 18 on the n-type surface region can be made high by the application of a negative charge adjacent its surface. A reversal of charge as obtained by reversing the polarization in the ferroelectric, for example by applying a signal to terminal 26 which is positive relative to terminal 27 and of sufficient magnitude to reverse the remnant polarization of the ferroelectric, will place region 15 in the high conductivity condition since the region will then utilize its entire thickness beyond the space charge region around the reverse biased junction in the conduction process. Further, when the ferroelectric adjacent the surface of region 15 is polarized positively, there is a tendency to increase the concentration of majority charge carriers or electrons in region 15 and thus a tendency to further reduce its impedance below that normally present in the absence of any polarization.

Figure 3:
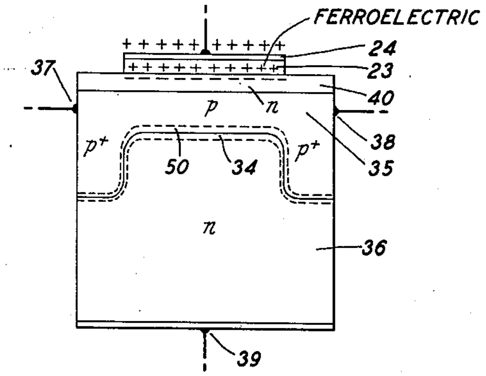
Fig. 3 shows a device having the conductivity type of its respective semiconductive parts reversed from that of the device of Figs. 1 and 2 together with the charge distribution on the device for an operating state corresponding to that depicted in Fig. 2.

Fig. 3 shows a structure operating under the same principle as that disclosed in Figs. 1 and 2 but sensitive to signals of opposite polarity applied to the ferroelectric. This structure comprises an n-type major semiconductive portion 36 and a p-type surface portion 35 which may be operated in the circuit of Fig. 1 by reversing the polarity of the potentials applied. Junction 34 is reverse biased by poling terminal 37 connected to p-type region 35 negative with respect to terminal 39 connected to n-type region 36 to produce a space charge region 50 in the vicinity of junction 34 corresponding to that discussed with regard to Fig. 2. In a device of this nature a high impedance condition can be established between terminals 37 and 38 across p-type region 35 by forming an n-type inversion layer 40 thereon by establishing a positive charge in the vicinity of that surface. This positive charge may be established with a ferroelectric body 23 by applying a signal which polarizes its electrode 24 positive with respect to the semiconductive body. As is the case of the device of Figs. 1 and 2, the remnant polarization of this ferroelectric will persist after the removal of the voltage on terminal 26 and will maintain the impedance of p-type region 35 between terminals 37 and 38 at a high level. This conductance change of the semiconductor will continue as a memory of the sign of the signal voltage applied over a substantial interval. Again, the device may be switched to the high conductivity condition at will by applying a negative voltage to terminal 26 of sufficient magnitude to reverse the remnant polarization in ferroelectric body 23.

While devices of this nature can be produced utilizing a number of ferroelectric materials, there are some combinations of elements which are particularly advantageous. Specifically, in operation it is desirable to employ as small a signal voltage across terminals 26 and 27 as is effective in polarizing the ferroelectric body 23. Therefore, it is desirable to effectively concentrate the electrostatic field developed between the surface of the semiconductor and the electrode 24 in the ferroelectric body. Since some of the effective field strength will be lost in any gaps which exist between the electrodes and the ferroelectric, these surfaces should be matched as closely as possible. The semiconductor surface can be made flat by lapping and polishing techniques well known in the art. Similarly, the ferroelectric crystal surface to be positioned against the semiconductor can be made quite flat by a shearing of the crystal or by mechanical and chemical abrading and polishing processes. It has been found that even with substantial precautions, gaps of the order of a tenth of a mil exist at the semiconductor-ferroelectric interface in devices of the nature considered here. One means of reducing the electrostatic field and the likelihood of dielectric breakdown in this gap is to employ therein some dielectric substance having a high dielectric constant, a high breakdown voltage, chemical stability, and low leakage characteristics. This dielectric should also be such as to be flowable whereby it can be employed to fill the gap effectively. Two such dielectrics typical of those suitable for this purpose are nitrobenzene and ethylene cyanide. The gap at the interface between the electrode 24 and the ferroelectric body 23 should also be kept at a minimum. This can be done conveniently by employing a metallic paste as the electrode and air drying it on the ferroelectric. One such paste suitable for this use is a commercial silver paste.

Another consideration in reducing the signal potentials and the necessary electrostatic field is the thickness of the ferroelectric body 23. This body should be thin in order to enable high electrostatic fields to be generated with low signal voltages. One class of ferroelectrics is particularly well suited in the present application, namely, those isomorphous crystals containing the guanidinium ion set forth in the application of B. T. Matthias entitled "Ferroelectric Storage Device," Serial No. 489,193, filed herewith, and particularly guanidinium aluminum sulfate hexahydrate ($CN_3H_6Al(SO_4)_2 6H_2O$). These materials offer advantages in that they have a low small signal dielectric constant as compared with ferroelectrics such as barium titanate and a low saturation polarization which requires the application of an electrostatic field of considerably lower magnitude in order to operate along their ferroelectric hysteresis loop. Thus, these materials further contribute to a device which can be operated with low applied fields and therefore have less of a tendency to break down the dielectric or to otherwise undesirably affect the conduction characteristics of the semiconductor with which they are associated.

Although the above discussion has specifically mentioned only silicon and germanium as suitable semiconductors, it is to be understood that other materials of this nature of either single crystal or polycrystalline form can be employed in effecting switching and memory operations. More specifically, the semiconductors silicon, germanium, silicon-germanium alloys, group III and group V intermetallic compounds, tellurium, selenium, and the numerous semiconductive compounds can be employed to form thin conductive paths whose conductivity is sensitive to a charge applied adjacent its surface through the medium of a ferroelectric body. Further, other ferroelectric materials than those specifically set forth above can be employed to apply a charge having a memory characteristic, for example barium titanate, Rochelle salt, ammonium dihydrogen phosphate, and ammonium lithium tartrate. These devices will all have a memory characteristic in that their conduction condition as established by the application of a signal across the ferroelectric will persist after the removal of the signal due to the remnant polarization within the ferroelectric. Further, all of these devices can be switched quickly by reversing the polarization of the ferroelectric.

It is to be understood that the above-described arrangements are illustrative of the application of the principle of the invention. Numerous other ararngements may be devised by those skilled in the art without departing from the spirit and scope of the invention.

What is claimed is:

1. Apparatus which comprises a body of semiconductive material having a bulk portion of one conductivity type and a surface region of the opposite conductivity type, a pair of spaced low resistance, substantially nonrectifying connections to said surface region, a body of ferroelectric material in close proximity to said surface region intermediate said connections, and an electrode spaced from said semiconductive body and mounted against said ferroelectric body.

2. Apparatus which comprises a body of semiconductive material including a surface region of n conductivity type on a major portion of p conductivity type, a pair of spaced low resistance, substantially nonrectifying connections to said n-type surface region, a body of ferroelectric material in close proximity to said surface region intermediate said connections, and an electrode spaced from said semiconductive body and mounted against said ferroelectric body.

3. Apparatus which comprises a body of semiconductive material including a surface region of p conductivity type on a major portion of n conductivity type, a pair of spaced low resistance, substantially nonrectifying connections to said p-type surface region, a body of ferroelectric material in close proximity to said surface region intermediate said connections, and an electrode spaced from said semiconductive body and mounted against said ferroelectric body.

4. Apparatus which comprises a body of semiconductive material including a surface region of one conductivity and a major portion of opposite conductivity type forming an n-p junction between said surface region and said body portion, a pair of spaced low resistance, substantially nonrectifying connections to said surface region, a low resistance, nonrectifying connection to said major body portion, means applying a reverse bias across said junction, a body of ferroelectric material in close proximity to said surface region intermediate said pair of connections and an electrode spaced from said semiconductive body and mounted against said ferroelectric body.

5. Apparatus which comprises a body of semiconductive material having a major portion of one conductivity type and a surface region of the opposite conductivity type having a depth from said surface of about $2 \times 10^{-5}$ centimeters, a pair of spaced low resistance, substantially nonrectifying connections to said surface region, a body of ferroelectric material in close proximity to said surface region intermediate said connections, and an electrode spaced from said semiconductive body and mounted against said ferroelectric body.

6. Apparatus for the storage of information which comprises a body of semiconductive material having a portion of one conductivity type and a surface region of the opposite conductivity type, a pair of spaced low resistance, substantially nonrectifying connections to said surface region, a body of ferroelectric material in close proximity to said surface region intermediate said connections, an electrode spaced from said semiconductive body and mounted against said ferroelectric body, and means to establish a remnant polarization of electrostatic charge in said ferroelectric body.

References Cited in the file of this patent

UNITED STATES PATENTS 2,773,250 Aigrain et al. ___________ Dec. 4, 1956

OTHER REFERENCES

A text book, "Electrons and Holes in Semi-Conductors," by Schockley, published November 1950, pp. 29 and 30.

Proceedings of Weston Computer Conference, June 1953, "The Snapping Dipoles of Ferroelectrics as a Memory Element for Digital Computers," by Pulvari, page 158 referred to.